(12) United States Patent
Nachimuthu et al.

(10) Patent No.: US 10,567,166 B2
(45) Date of Patent: Feb. 18, 2020

(54) TECHNOLOGIES FOR DIVIDING MEMORY ACROSS SOCKET PARTITIONS

(71) Applicant: Intel Corporation, Santa Clara, CA (US)

(72) Inventors: Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 15/856,556

(22) Filed: Dec. 28, 2017

(65) Prior Publication Data

US 2019/0042136 A1 Feb. 7, 2019

Related U.S. Application Data

(60) Provisional application No. 62/584,401, filed on Nov. 10, 2017.

(30) Foreign Application Priority Data

Aug. 30, 2017 (IN) .............................. 201741030632

(51) Int. Cl.
*G06F 12/00* (2006.01)
*H04L 9/08* (2006.01)
(Continued)

(52) U.S. Cl.
CPC .......... *H04L 9/0819* (2013.01); *G06F 3/0604* (2013.01); *G06F 3/0605* (2013.01); *G06F 3/065* (2013.01); *G06F 3/067* (2013.01);
*G06F 3/0611* (2013.01); *G06F 3/0613* (2013.01); *G06F 3/0629* (2013.01); *G06F 3/0631* (2013.01); *G06F 3/0632* (2013.01); *G06F 3/0644* (2013.01); *G06F 3/0647* (2013.01); *G06F 3/0659* (2013.01); *G06F 3/0673* (2013.01); *G06F 3/0683* (2013.01);
(Continued)

(58) Field of Classification Search
None
See application file for complete search history.

(56) References Cited

U.S. PATENT DOCUMENTS

2008/0162734 A1* 7/2008 Uehara ................. G06F 11/004
710/3
2009/0164747 A1* 6/2009 Harikumar .......... G06F 12/0284
711/202

(Continued)

*Primary Examiner* — Ryan Bertram
*Assistant Examiner* — Trang K Ta
(74) *Attorney, Agent, or Firm* — Barnes & Thornburg LLP

(57) ABSTRACT

Technologies for dividing resources across partitions include a compute sled. The compute sled is to determine partitions among sockets of the compute sled. Each socket is associated with a corresponding processor. The compute sled is also to establish a separate memory space for each determined partition, obtain, from an application executed in one of the sockets, a request to access a logical memory address, identify the partition associated with the memory access request, determine a corresponding physical memory address as a function of the identified partition and the logical memory address, and access a memory of the compute sled at the determined physical memory address. Other embodiments are also described and claimed.

16 Claims, 16 Drawing Sheets

(51) Int. Cl.

| | | |
|---|---|---|
| G06F 3/06 | (2006.01) | |
| G06F 9/50 | (2006.01) | |
| H04L 29/06 | (2006.01) | |
| H04L 29/08 | (2006.01) | |
| G06F 16/25 | (2019.01) | |
| G06F 16/2453 | (2019.01) | |
| H04L 12/861 | (2013.01) | |
| G11C 8/12 | (2006.01) | |
| G11C 29/02 | (2006.01) | |
| H04L 12/24 | (2006.01) | |
| G11C 29/36 | (2006.01) | |
| G11C 29/38 | (2006.01) | |
| G11C 29/44 | (2006.01) | |
| G06F 16/22 | (2019.01) | |
| G06F 16/2455 | (2019.01) | |
| G06F 12/02 | (2006.01) | |
| G06F 12/14 | (2006.01) | |
| G06F 13/16 | (2006.01) | |
| G06F 15/173 | (2006.01) | |
| G06F 13/40 | (2006.01) | |
| G06F 13/42 | (2006.01) | |
| G06F 9/448 | (2018.01) | |
| G06F 9/28 | (2006.01) | |
| G06F 15/16 | (2006.01) | |
| H04L 12/703 | (2013.01) | |
| H04L 12/743 | (2013.01) | |
| H04L 12/801 | (2013.01) | |
| H04L 12/803 | (2013.01) | |
| H04L 12/935 | (2013.01) | |
| H04L 12/931 | (2013.01) | |
| G06F 9/4401 | (2018.01) | |
| G06F 9/445 | (2018.01) | |
| G06F 12/06 | (2006.01) | |
| G06F 16/23 | (2019.01) | |
| G06F 16/248 | (2019.01) | |
| G06F 16/901 | (2019.01) | |
| G06F 16/11 | (2019.01) | |
| G06F 12/0802 | (2016.01) | |
| G06F 12/1045 | (2016.01) | |

(52) U.S. Cl.
CPC ............ *G06F 3/0685* (2013.01); *G06F 9/28* (2013.01); *G06F 9/445* (2013.01); *G06F 9/4406* (2013.01); *G06F 9/4411* (2013.01); *G06F 9/4494* (2018.02); *G06F 9/5044* (2013.01); *G06F 9/5088* (2013.01); *G06F 12/023* (2013.01); *G06F 12/06* (2013.01); *G06F 12/0607* (2013.01); *G06F 12/14* (2013.01); *G06F 13/1663* (2013.01); *G06F 13/1668* (2013.01); *G06F 13/4068* (2013.01); *G06F 13/42* (2013.01); *G06F 15/161* (2013.01); *G06F 15/17331* (2013.01); *G06F 16/119* (2019.01); *G06F 16/221* (2019.01); *G06F 16/2237* (2019.01); *G06F 16/2255* (2019.01); *G06F 16/2282* (2019.01); *G06F 16/2365* (2019.01); *G06F 16/248* (2019.01); *G06F 16/2453* (2019.01); *G06F 16/2455* (2019.01); *G06F 16/24553* (2019.01); *G06F 16/25* (2019.01); *G06F 16/9014* (2019.01); *G11C 8/12* (2013.01); *G11C 29/028* (2013.01); *G11C 29/36* (2013.01); *G11C 29/38* (2013.01); *G11C 29/44* (2013.01); *H04L 9/0894* (2013.01); *H04L 41/0213* (2013.01); *H04L 41/0668* (2013.01); *H04L 41/0677* (2013.01); *H04L 41/0893* (2013.01); *H04L 41/0896* (2013.01); *H04L 45/28* (2013.01); *H04L 45/7453* (2013.01); *H04L 47/11* (2013.01); *H04L 47/125* (2013.01); *H04L 49/30* (2013.01); *H04L 49/351* (2013.01); *H04L 49/9005* (2013.01); *H04L 69/12* (2013.01); *H04L 69/22* (2013.01); *H04L 69/32* (2013.01); *H04L 69/321* (2013.01); *G06F 12/0802* (2013.01); *G06F 12/1054* (2013.01); *G06F 12/1063* (2013.01); *G06F 2201/85* (2013.01); *G06F 2209/509* (2013.01); *G06F 2212/1044* (2013.01); *G06F 2212/1052* (2013.01); *G06F 2212/601* (2013.01); *G06F 2213/0064* (2013.01)

(56) References Cited

U.S. PATENT DOCUMENTS

| | | | |
|---|---|---|---|
| 2012/0102273 A1* | 4/2012 | Chang | G06F 12/0692 711/143 |
| 2016/0274941 A1* | 9/2016 | Krithivas | G06F 9/5072 |

\* cited by examiner

TECHNOLOGIES FOR DIVIDING MEMORY ACROSS SOCKET PARTITIONS

CROSS-REFERENCE TO RELATED APPLICATIONS

The present application claims the benefit of Indian Provisional Patent Application No. 201741030632, filed Aug. 30, 2017 and U.S. Provisional Patent Application No. 62/584,401, filed Nov. 10, 2017.

BACKGROUND

In a typical data center, such as a cloud data center, a compute device may execute multiple operating systems in corresponding virtual machines (e.g., one virtual machine per customer or per application). In such systems, a hypervisor or other management software executing on the compute device is tasked with controlling which resources (e.g., memory address ranges) each virtual machine is allowed to access. In other words, the underlying hardware and firmware (e.g., the basic input output system (BIOS)) presents an aggregated view of the memory to the software, which then divides the memory among the virtual machines. As such, the compute device consumes processing capacity executing a software layer to manage memory access requests from the operating systems to maintain the separate memory spaces, when that processing capacity could have otherwise been used to increase the speed of execution of an application on behalf of a customer.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
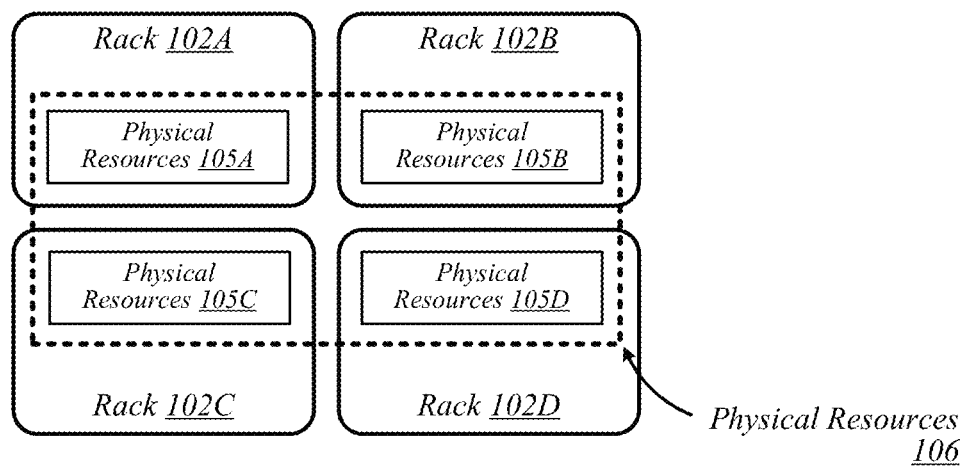
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
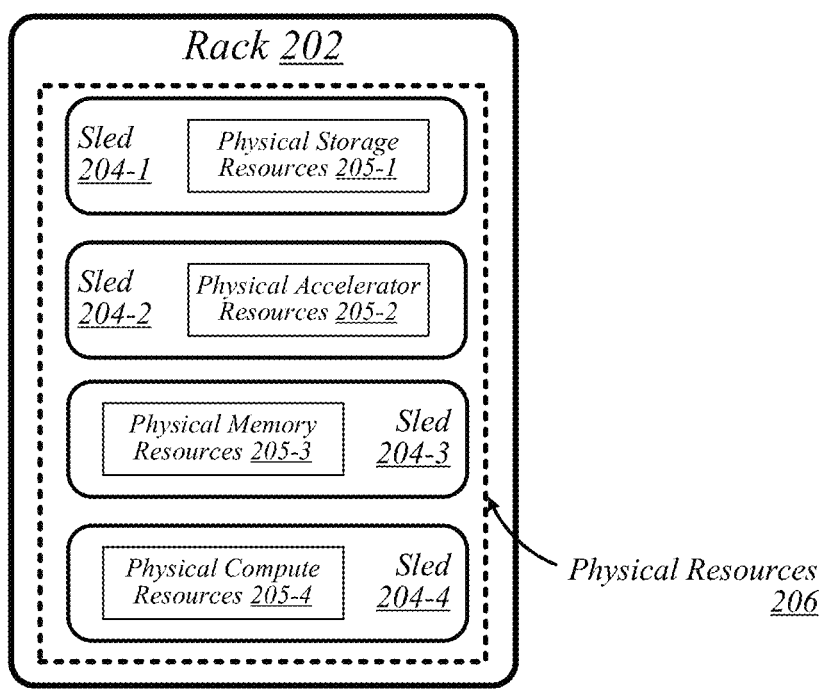
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
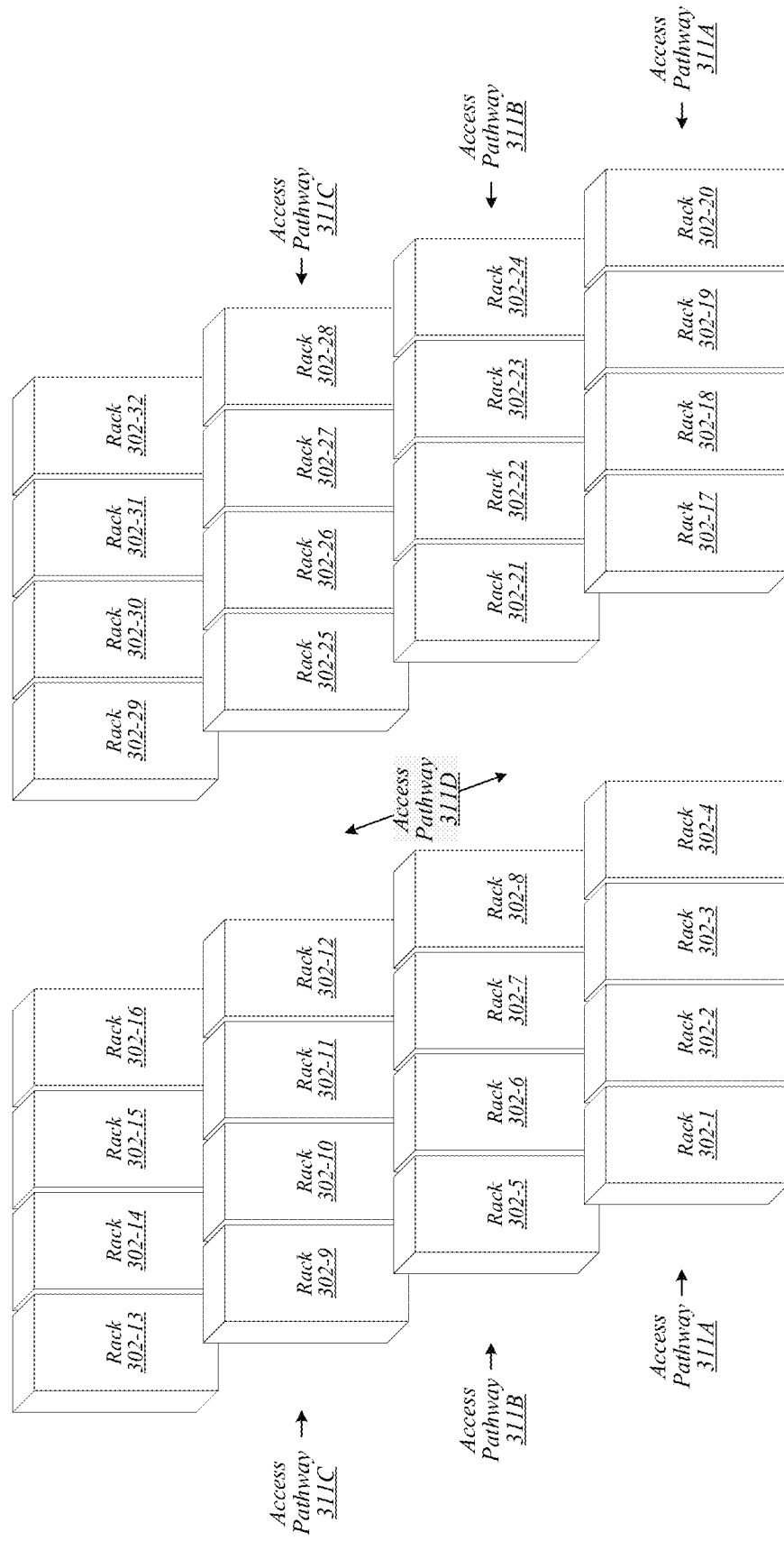
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
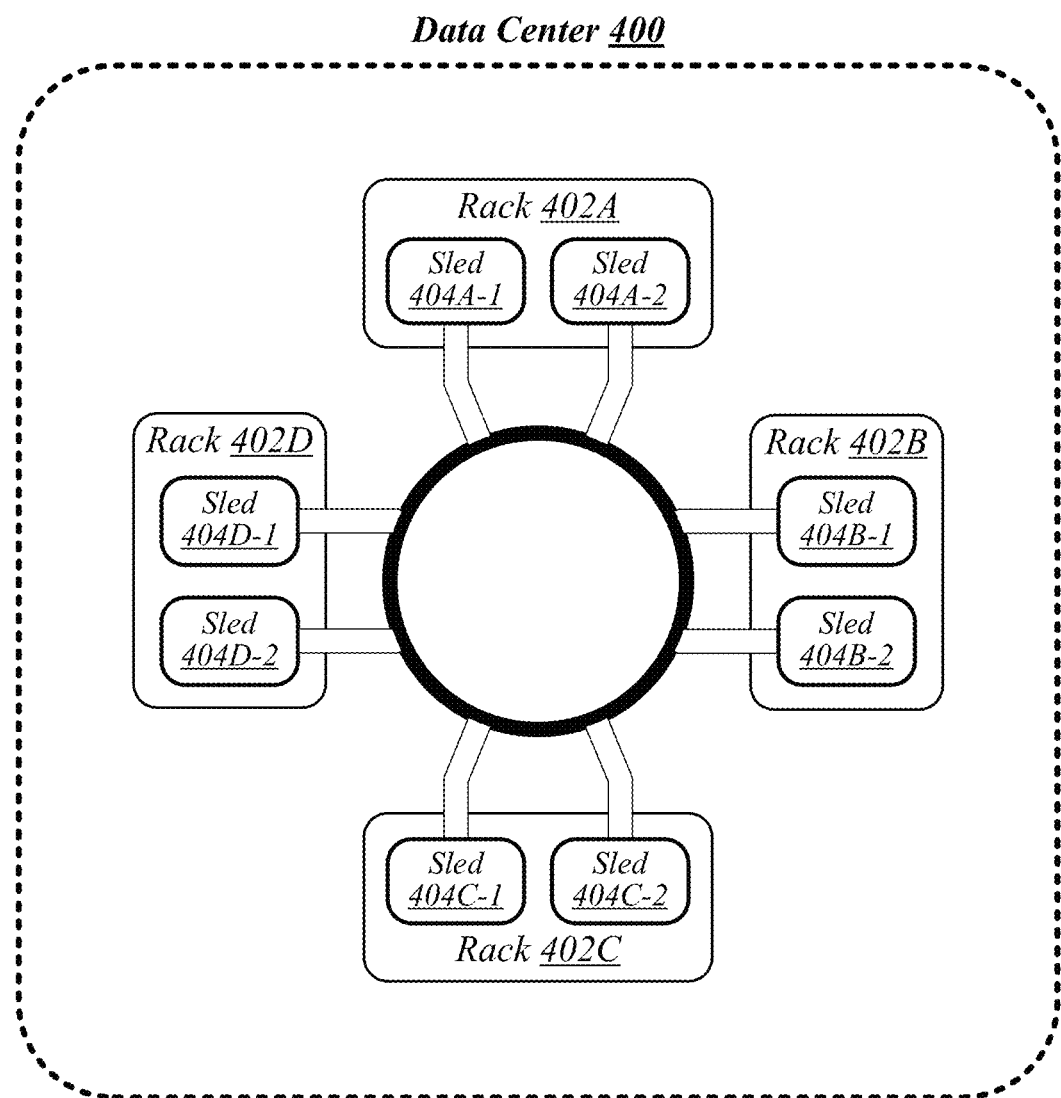
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
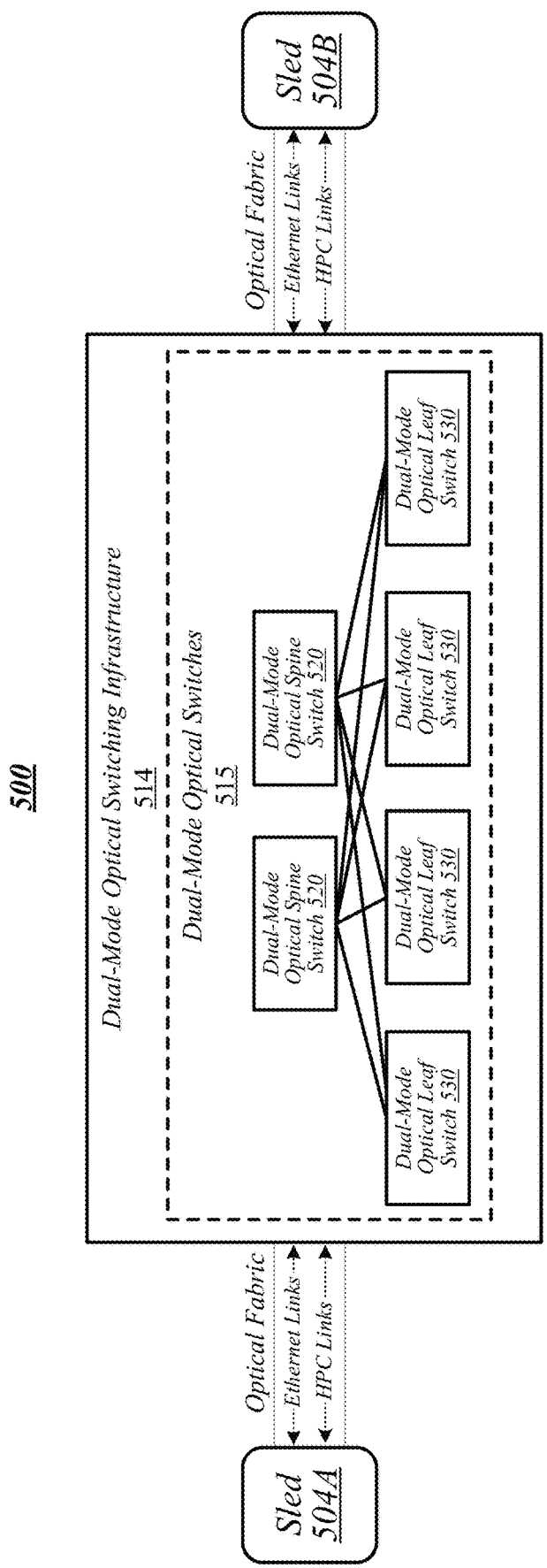
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
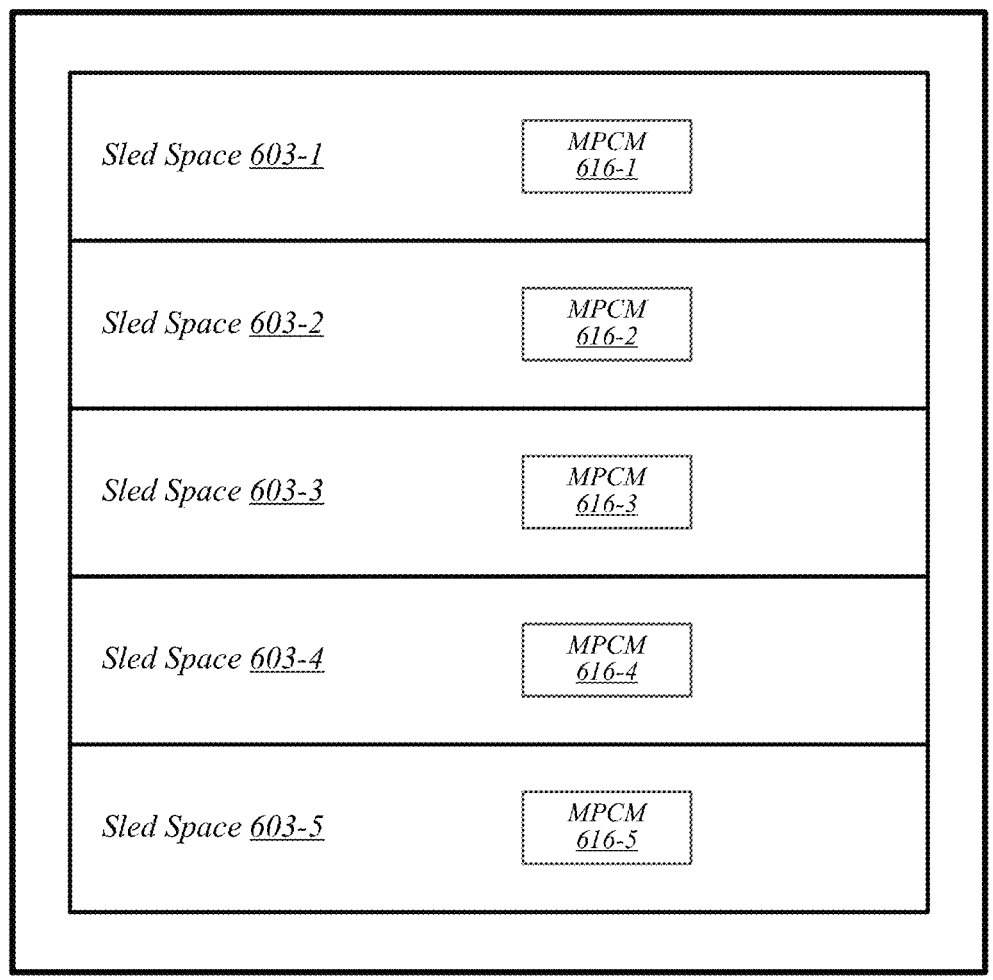
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
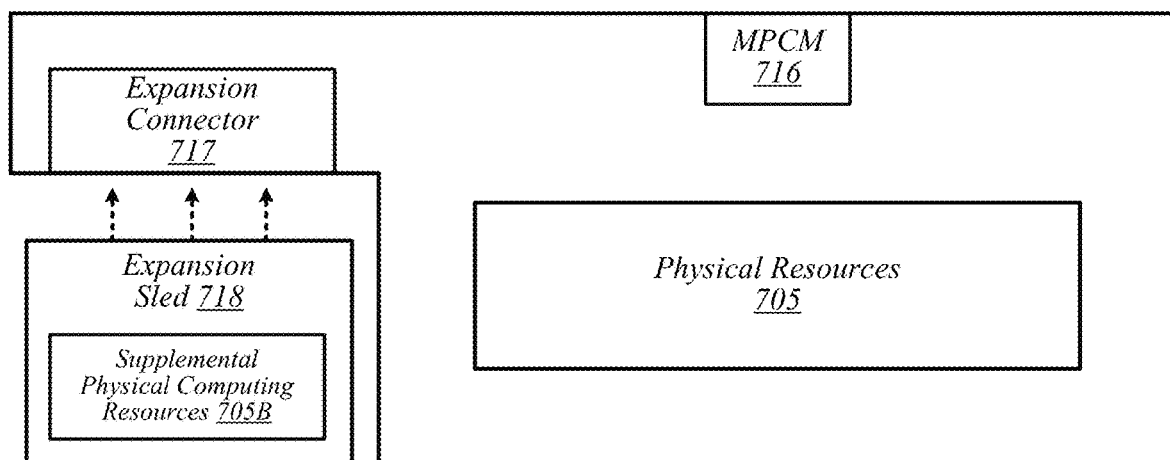
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
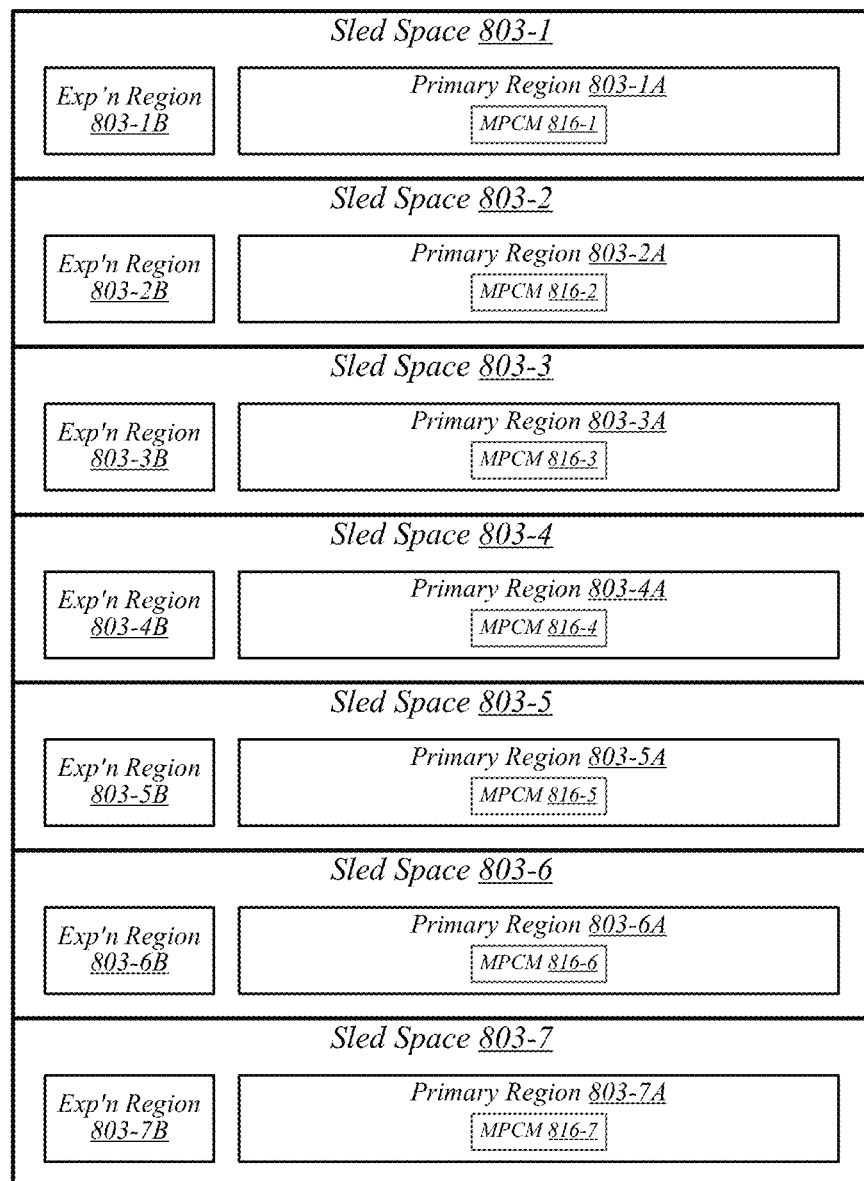
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
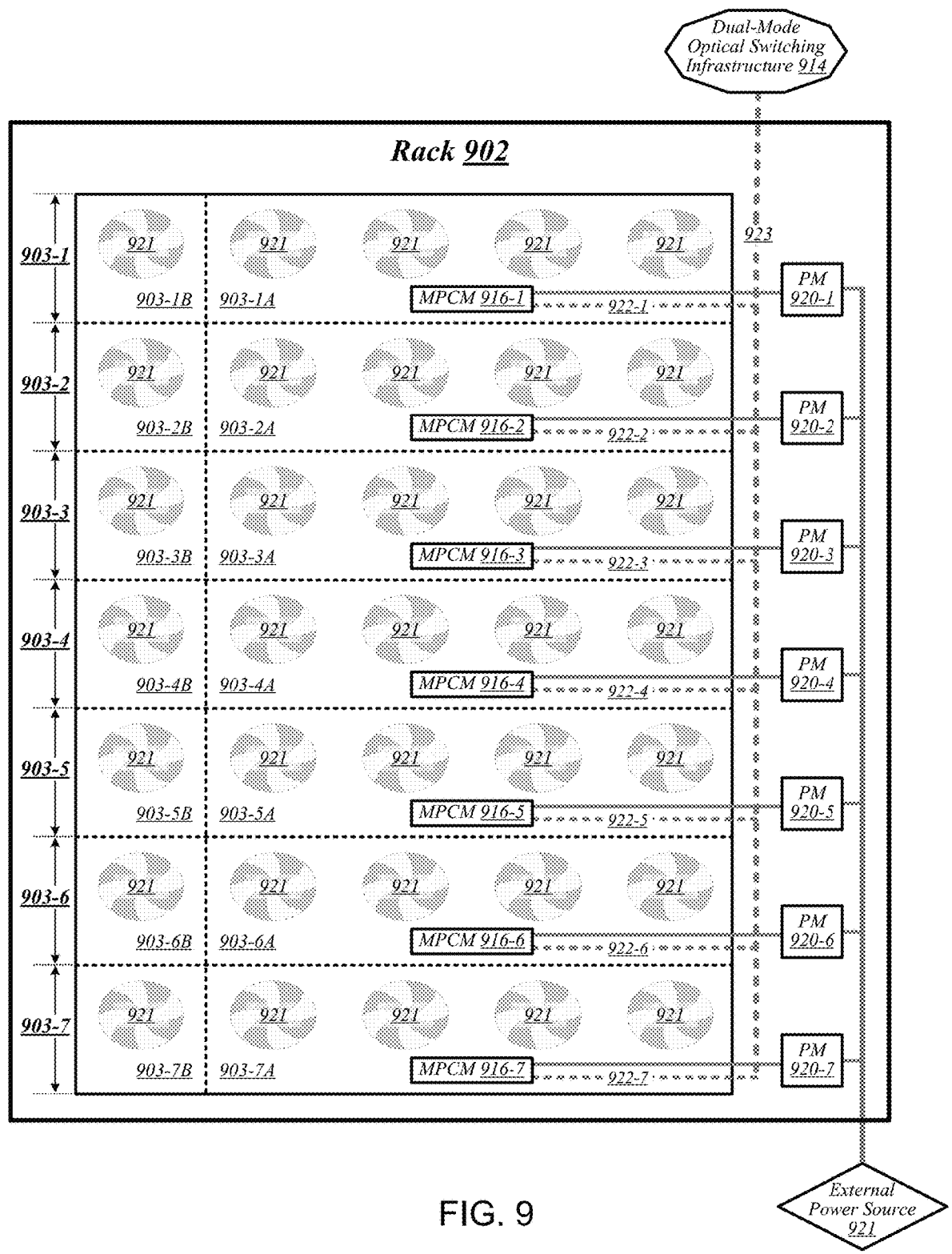
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
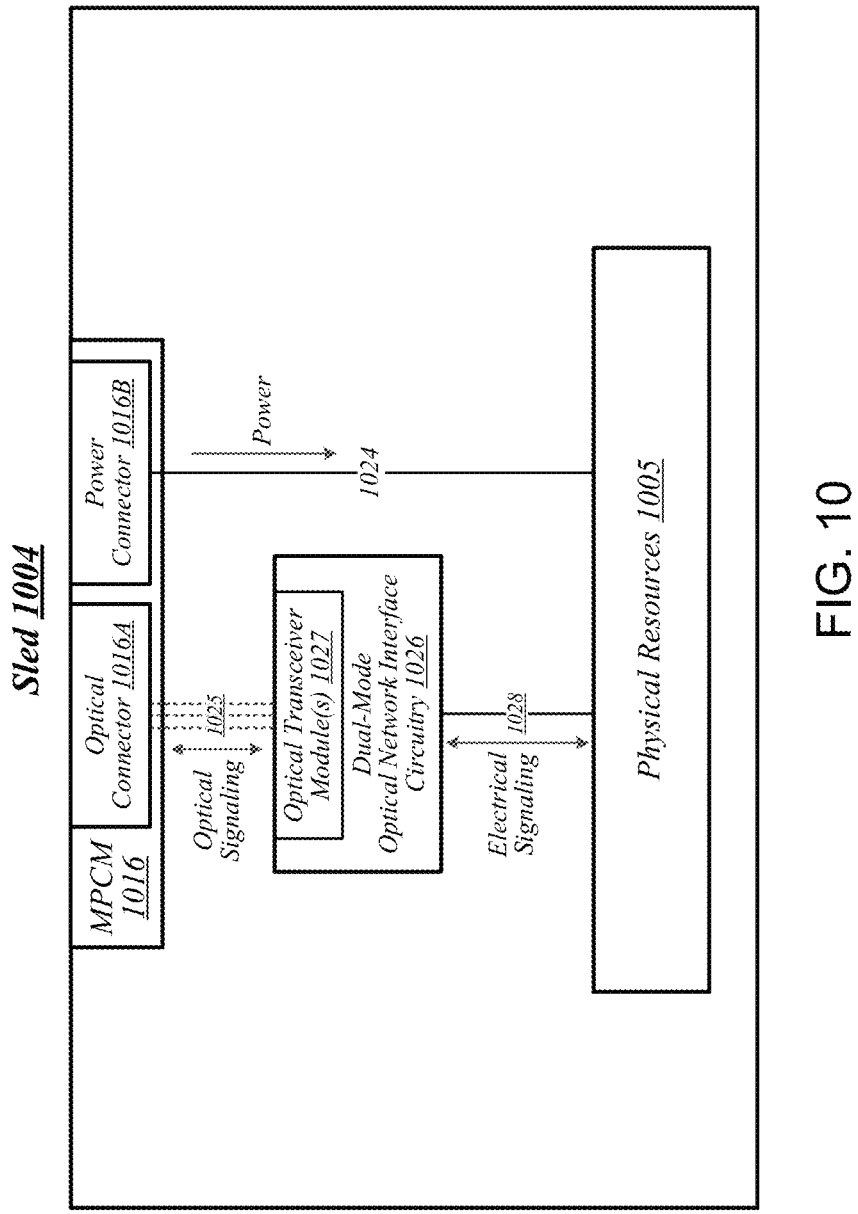
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
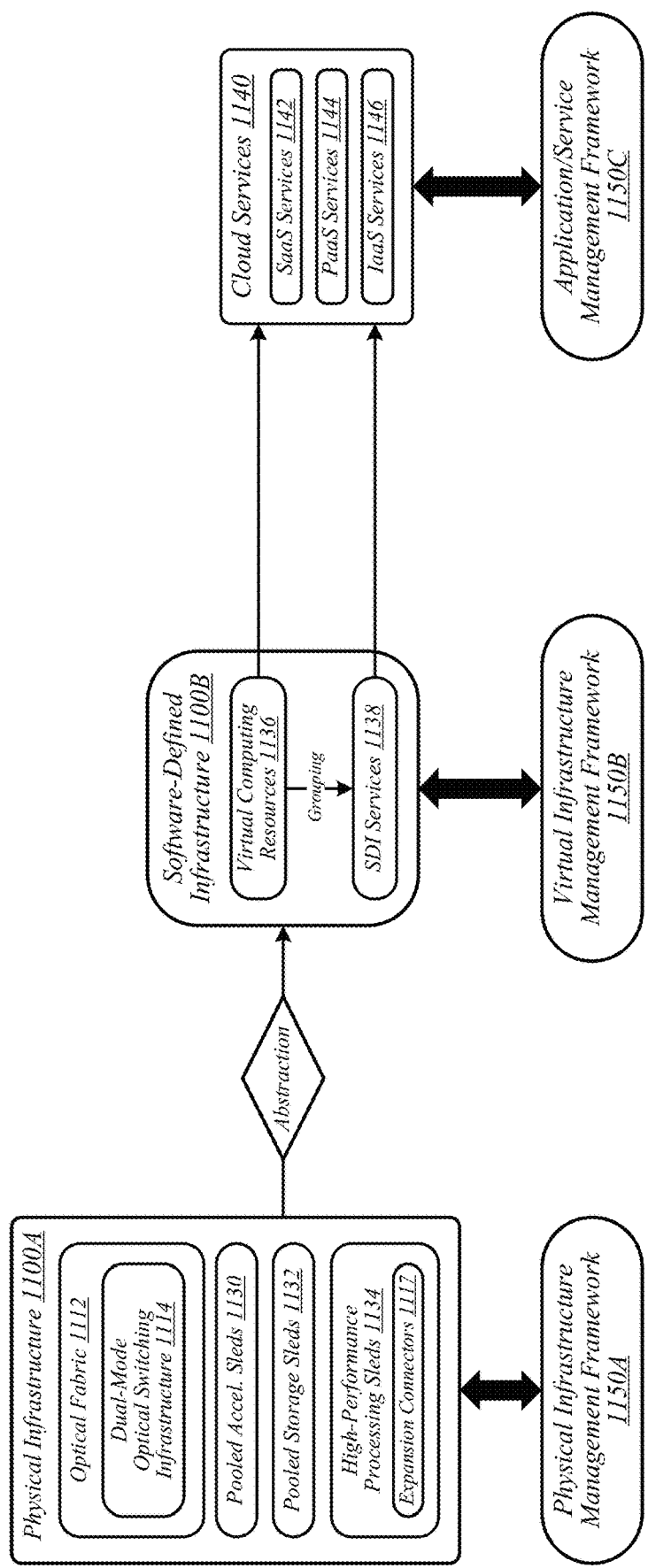
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center

1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
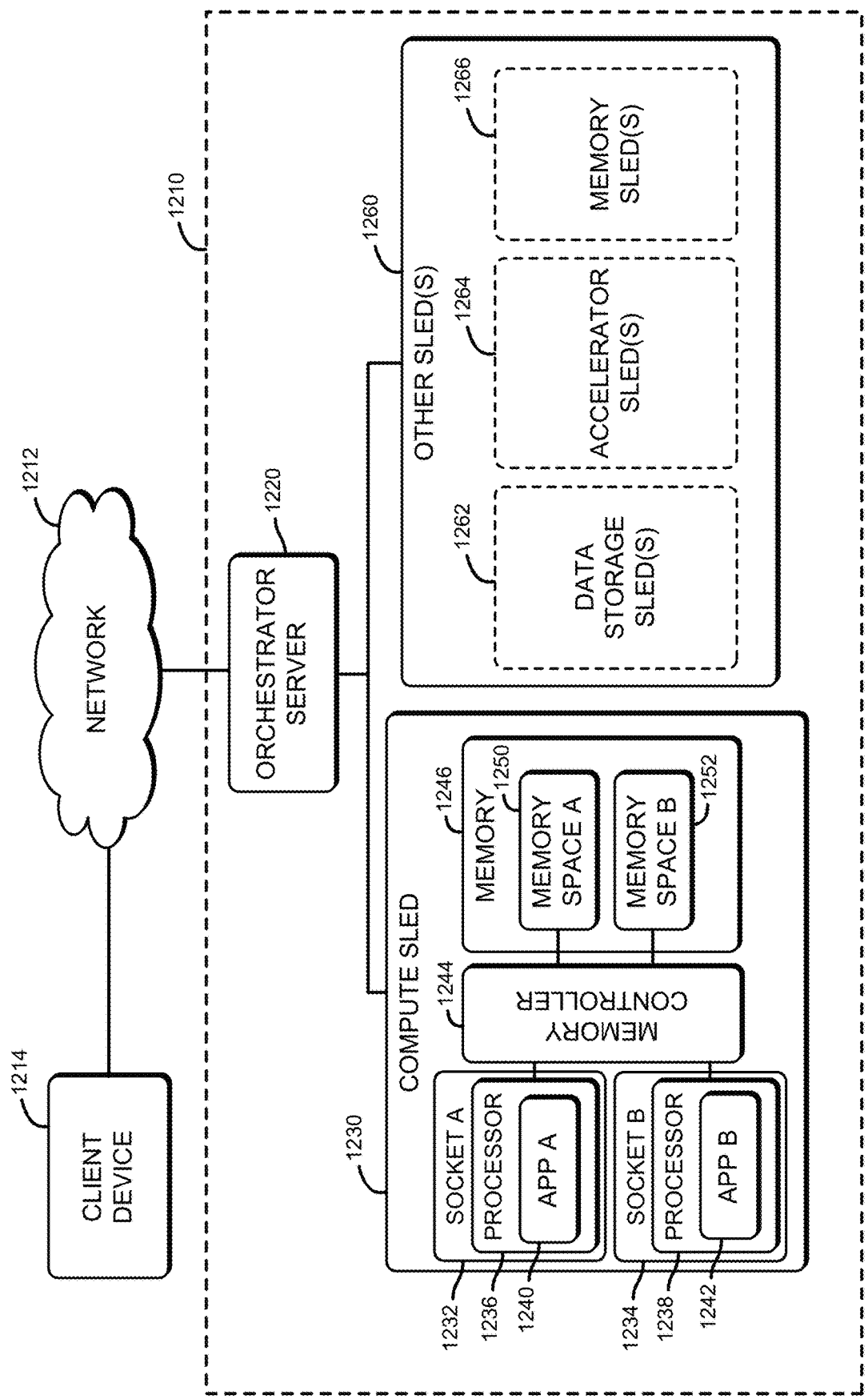
FIG. 12 is a simplified block diagram of at least one embodiment of a system for dividing memory across socket partitions to improve the efficiency of execution of workloads in a data center.

Referring now to FIG. 12, a system 1210 for dividing memory across socket partitions (e.g., a logical grouping of one or more devices to be assigned to a corresponding memory space) in a compute sled to improve the efficiency of execution of workloads may be implemented in accordance with the data centers 100, 300, 400, 1100 described above with reference to FIGS. 1, 3, 4, and 11. In the illustrative embodiment, the system 1210 includes an orchestrator server 1220 communicatively coupled to multiple sleds including a compute sled 1230 and one or more other sleds 1260. The sleds 1260 may include data storage sleds 1262, accelerator sleds 1264, memory sleds 1266, and/or other sleds (e.g., other compute sleds 1230). One or more of the sleds 1230, 1260 may be grouped into a managed node, such as by the orchestrator server 1220, to collectively perform a workload (e.g., an application). A managed node may be embodied as an assembly of resources (e.g., physical resources 206), such as compute resources (e.g., physical compute resources 205-4), memory resources (e.g., physical memory resources 205-3), storage resources (e.g., physical storage resources 205-1), or other resources (e.g., physical accelerator resources 205-2), from the same or different sleds (e.g., the sleds 204-1, 204-2, 204-3, 204-4, etc.) or racks (e.g., one or more of racks 302-1 through 302-32). Further, a managed node may be established, defined, or "spun up" by the orchestrator server 1220 at the time a workload is to be assigned to the managed node or at any other time, and may exist regardless of whether any workloads are presently assigned to the managed node. The system 1210 may be located in a data center and provide storage and compute services (e.g., cloud services) to a client device 1214 that is in communication with the system 1210 through a network 1212. The orchestrator server 1220 may support a cloud operating environment, such as OpenStack, and managed nodes established by the orchestrator server 1220 may execute one or more applications or processes (i.e., workloads), such as in virtual machines or containers, on behalf of a user of the client device 1214.

In the illustrative embodiment, the compute sled 1230 includes multiple sockets 1232, 1234 (e.g., a connector to a motherboard that forms an electrical interface with a processor or other device) and corresponding processors 1236, 1238 (e.g., a device or circuitry capable of performing a series of operations). Each processor 1236, 1238 may execute a corresponding workload, such as applications 1240, 1242 (e.g., software, one or more operations, etc.) assigned by the orchestrator server 1220. Additionally, the compute sled 1244 includes a memory controller 1244 and a memory 1246. In operation, as described in more detail herein, the memory controller 1244 divides the memory 1246 into separate memory spaces, such as memory spaces 1250, 1252, for each socket, such that any operating system or application executing in one socket only has access to physical memory addresses mapped to the memory space (e.g., the memory space 1250) allocated to that socket. As described in more detail herein, the memory 1246 may be divided into separate memory spaces at an even lower level than the sockets, such as for certain cores within each processor 1236, 1238, and is referred to herein as "sub-socket partitioning." As compared to typical systems in which the separation between memory spaces is performed by a software hypervisor that incurs processing overhead that could otherwise be used to execute the workloads (e.g., the applications), the compute sled 1230, in the illustrative embodiment, divides the memory at the hardware level, based on the cores and sockets that are executing each separate application. As a result, the compute sled 1230 may execute the applications 1240, 1242 more efficiently than in typical systems. In addition, the compute sled 1230 may route data to and from I/O devices of the compute sled 1230 based on the partitions among the sockets. As such, the compute sled 1230 may be less vulnerable to malware that could otherwise enable a workload to access resources on the compute sled 1230 (e.g., memory, I/O devices, etc.) that is intended to be used by a separate workload.

Figure 13:
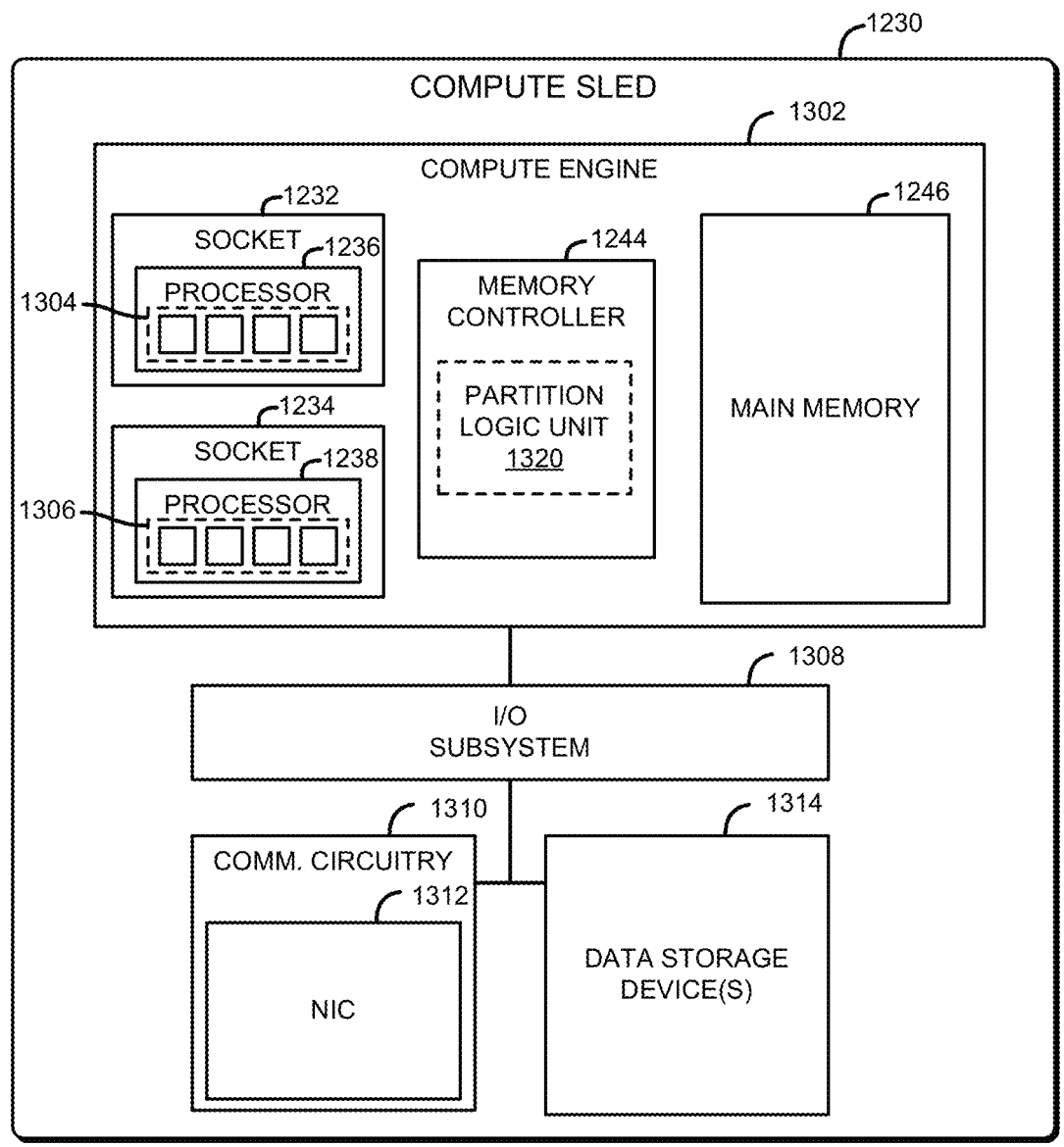
FIG. 13 is a simplified block diagram of at least one embodiment of a compute sled of the system of FIG. 12.

Referring now to FIG. 13, the compute sled 1230 may be embodied as any type of compute device capable of performing the functions described herein, including determining partitions among the sockets 1232, 1234, establishing separate memory spaces for each determined partition, obtaining, from an application executed in one of the sockets 1232, 1234, a request to access a logical memory address, identifying the partition associated with the memory access request, determining a corresponding physical memory address as a function of the identified partition and the logical memory address, and accessing the memory at the determined physical memory address.

As shown in FIG. 13, the illustrative compute sled 1230 includes a compute engine 1302, an input/output (I/O) subsystem 1308, communication circuitry 1310, and one or more data storage devices 1314. Of course, in other embodiments, the compute sled 1230 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1302 may be embodied as any type of device or collection of devices capable of performing various compute functions described below. In some embodiments, the compute engine 1302 may be embodied as a single device such as an integrated circuit, an embedded system, a field-programmable gate array (FPGA), a system-on-a-chip (SOC), or other integrated system or device. In the illustrative embodiment, the compute engine 1302 includes or is embodied as the processors 1236, 1238, the memory controller 1244, and the memory 1246. Each processor 1236, 1238 may be embodied as any type of processor capable of performing the functions described herein. For example, each processor 1236, 1238 may be embodied as a single or multi-core processor(s), a microcontroller, or other processor or processing/controlling circuit. In some embodiments, each processor 1236, 1238 may be embodied as, include, or be coupled to an FPGA, an application specific integrated circuit (ASIC), reconfigurable hardware or hardware circuitry, or other specialized hardware to facilitate performance of the functions described herein. In the illustrative embodiment, each processor 1236, 1238 includes a corresponding set of cores 1304, 1306, each of which may be embodied as any device or circuitry capable of receiving instructions and performing calculations or actions based on those instructions. While four cores are shown in each processor 1236, 1238, it should be understood that in other embodiments, the number of cores in each processor 1236, 1238 may be different. The memory controller 1244 may be embodied as any device or circuitry that manages the flow of data going to and from the main memory 1246. The memory controller 1244 may include a partition logic unit 1320, which may be embodied as any device or circuitry (e.g., an integrated circuit, a co-processor, etc.) capable of establishing separate memory spaces for each partition and routing memory access requests from the processors 1236, 1238 to the corresponding memory spaces in the main memory 1246. While shown as being separate from the processors 1236, 1238, it should be understood that, in some embodiments, the memory controller 1244 may be at least partially integrated into one or more of the processors 1236, 1238.

The main memory 1246 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 1246 may be integrated into one or more of the processors 1236, 1238. In operation, the main memory 1246 may store various software and data used during operation such as partition identifiers, memory map data, workload data, applications, programs, libraries, and drivers.

The compute engine 1302 is communicatively coupled to other components of the compute sled 1230 via the I/O subsystem 1308, which may be embodied as circuitry and/or components to facilitate input/output operations with the compute engine 1302 (e.g., with the processors 1236, 1238 and/or the main memory 1246) and other components of the compute sled 1230. For example, the I/O subsystem 1308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1308 may form a portion of a system-on-a-chip (SoC) and be incorporated, along with one or more of the processors 1236, 1238, the main memory 1246, and other components of the compute sled 1230, into the compute engine 1302.

The communication circuitry 1310 may be embodied as any communication circuit, device, or collection thereof, capable of enabling communications over the network 1212 between the compute sled 1230 and another compute device (e.g., the orchestrator server 1220, the sleds 1260, etc.). The communication circuitry 1310 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1310 includes a network interface controller (NIC) 1312, which may also be referred to as a host fabric interface (HFI). The NIC 1312 may be embodied as one or more add-in-boards, daughter cards, network interface cards, controller chips, chipsets, or other devices that may be used by the compute sled 1230 to connect with another compute device (e.g., the orchestrator server 1220, the sleds 1260, etc.). In some embodiments, the NIC 1312 may be embodied as part of a system-on-a-chip (SoC) that includes one or more processors, or included on a multichip package that also contains one or more processors. In some embodiments, the NIC 1312 may include a local processor (not shown) and/or a local memory (not shown) that are both local to the NIC 1312. In such embodiments, the local processor of the NIC 1312 may be capable of performing one or more of the functions of the compute engine 1302 described herein. Additionally or alternatively, in such embodiments, the local memory of the NIC 1312 may be integrated into one or more components of the compute sled 1230 at the board level, socket level, chip level, and/or other levels.

The one or more illustrative data storage devices 1314 may be embodied as any type of devices configured for short-term or long-term storage of data such as, for example, memory devices and circuits, memory cards, hard disk drives, solid-state drives, or other data storage devices. Each data storage device 1314 may include a system partition that stores data and firmware code for the data storage device 1314. Each data storage device 1314 may also include one or more operating system partitions that store data files and executables for operating systems.

The client device 1214, the orchestrator server 1220, and the sleds 1260 may have components similar to those described in FIG. 13. The description of those components of the compute sled 1230 is equally applicable to the description of components of those devices and is not repeated herein for clarity of the description. Further, it should be appreciated that any of the client device 1214, the orchestrator server 1220, and the sleds 1230, 1260 may include other components, sub-components, and devices commonly found in a computing device, which are not discussed above in reference to the compute sled 1230 and not discussed herein for clarity of the description.

As described above, the client device 1214, the orchestrator server 1220, and the sleds 1230, 1260 are illustratively in communication via the network 1212, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 14:
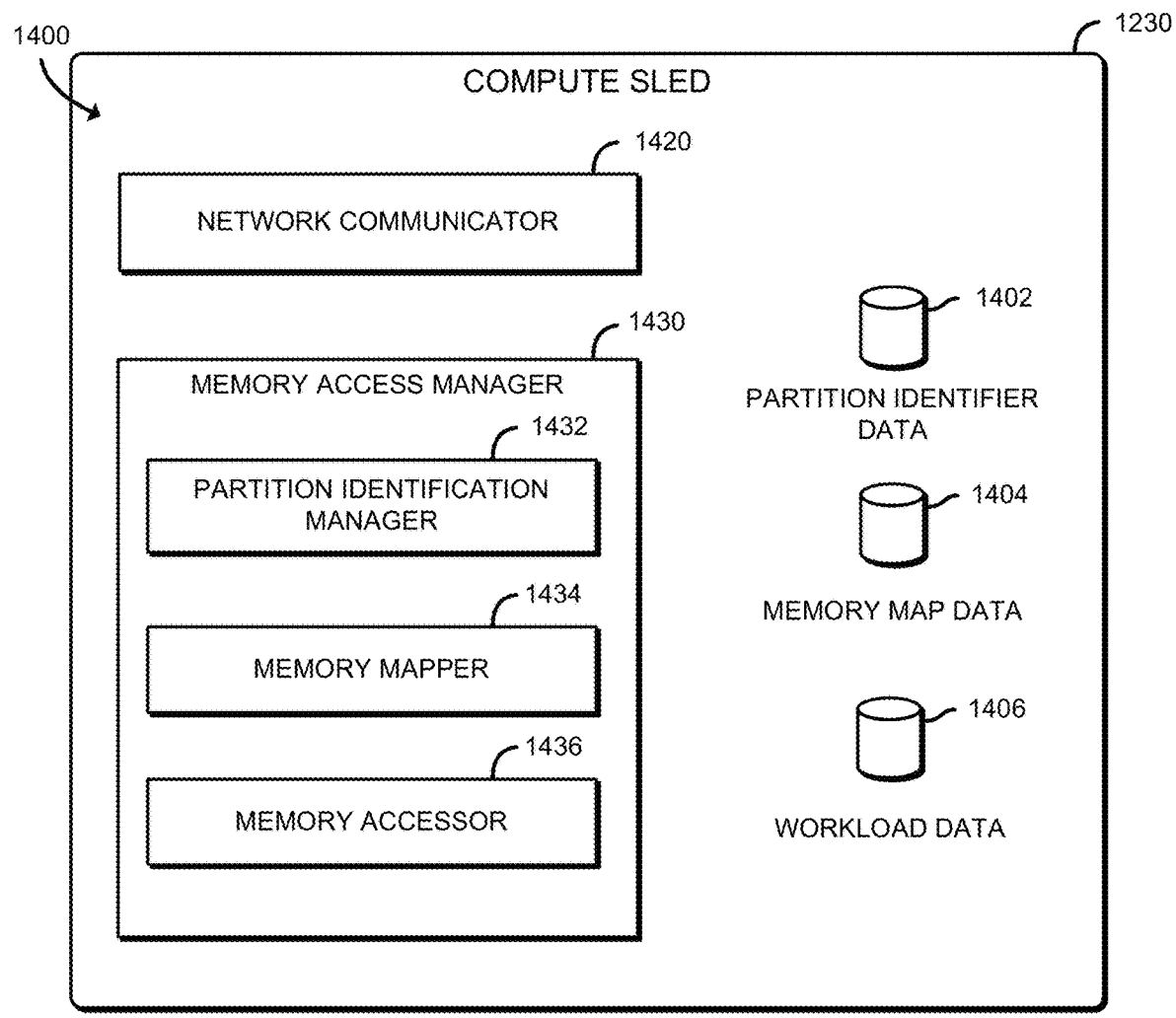
FIG. 14 is a simplified block diagram of at least one embodiment of an environment that may be established by the compute sled of FIGS. 12 and 13.

Referring now to FIG. 14, the compute sled 1230 may establish an environment 1400 during operation. The illustrative environment 1400 includes a network communicator 1420 and a memory access manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, memory access manager circuitry 1430, etc.). It should be appreciated that, in such embodiments, one or more of the network communicator circuitry 1420 or memory access manager circuitry 1430 may form a portion of one or more of the compute engine 1302, the partition logic unit 1320, the I/O subsystem 1308, and/or other components of the compute sled 1230. In the illustrative embodiment, the environment 1400 includes partition identifier data 1402, which may be embodied as any data indicative of identifiers of partitions at the socket level (e.g., one partition per socket 1232, 1234) or sub-socket level (one partition for a set of cores in processor 1236 and another partition for another set of cores in the same processor 1236, etc.) that are each to have a separate memory space in the memory 1246. The identifiers may be numeric (e.g., integers in a sequence), alphanumeric codes, or other data that uniquely identifies each partition. Additionally, in the illustrative embodiment, the environment 1400 includes memory map data 1404 which may be embodied as any data indicative of a mapping between each partition identifier and a memory space (e.g., a range of logical memory addresses starting from zero) that is mapped to a range of physical memory addresses of the memory 1246. The illustrative environment 1400 also includes workload data 1406, which may be embodied as any data indicative of workloads (e.g., applications) assigned to the compute sled 1230 and data accessed from the memory during the execution of the workload (e.g., a data set to be operated on by the workload, such as a set of data to be encrypted, compressed, transcoded, etc.).

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the compute sled 1230, respectively. To do so, the network communicator 1420 is configured to receive and process data packets from one system or computing device (e.g., the orchestrator server 1220) and to prepare and send data packets to another computing device or system (e.g., one or more of the other sleds 1260). Accordingly, in some embodiments, at least a portion of the functionality of the network communicator 1420 may be performed by the communication circuitry 1310, and, in the illustrative embodiment, by the NIC 1312.

The memory access manager 1430, which may be embodied as hardware, firmware, software, virtualized hardware, emulated architecture, and/or a combination thereof, is configured to determine partitions among the sockets 1232, 1234 of the compute sled 1230, establish a separate memory space for each determined partition, and route memory access requests originating from each partition to the corresponding memory space. To do so, in the illustrative embodiment, the memory access manager 1430 includes a partition identification manager 1432, a memory mapper 1434, and a memory accessor 1436. The partition identification manager 1432, in the illustrative embodiment, is configured to determine the partitions among the sockets of the compute sled 1230 at the socket level or the sub-socket level (e.g., multiple partitions per socket, such as separate partitions for separate sets of cores within a processor). In doing so, the partition identification manager 1432 is configured to 1432 to assign a partition identifier to each partition that is usable to determine which memory space a memory access request is to be routed to. For example, a partition identifier may be stored in the partition identifier data 1402 with one or more serial numbers or other unique identifiers (e.g., socket numbers, core numbers, etc.) of the corresponding hardware (e.g., the socket and or specific cores within the corresponding processor). The memory mapper 1434, in the illustrative embodiment, is configured to generate the memory map data 1404, such as by determining an amount of memory to allocated to each partition (e.g., pursuant to a target amount of memory specified in a service level agreement (SLA) for an application executed by the corresponding partition, based on a predefined amount of memory to allocate to every partition, or based on other factors) and defining a separate memory space in the memory that is usable by the corresponding partition to the exclusion of the other partitions. The memory accessor 1436, in the illustrative embodiment, is configured to receive a memory request from a partition and route the memory request to the corresponding memory space, and ultimately, the corresponding physical memory address, as a function of a logical memory address included in the request and the identity of the partition that generated the memory access request.

Figure 15:
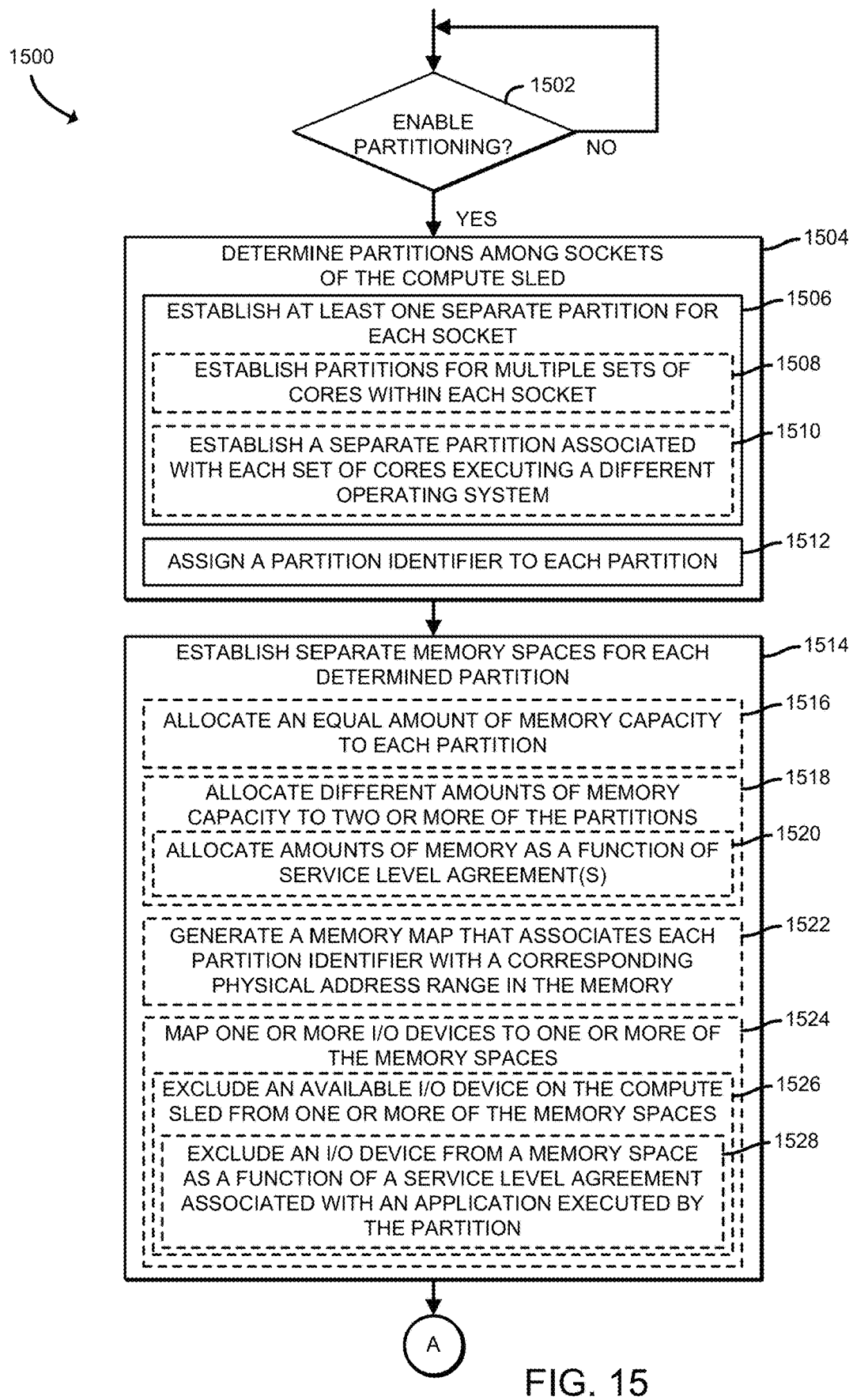
FIGS. 15-16 are a simplified flow diagram of at least one embodiment of a method for dividing memory across socket partitions that may be performed by the compute sled of FIGS. 12 and 13.

Referring now to FIG. 15, the compute sled 1230, in operation, may execute a method 1500 for dividing memory across socket partitions. The method 1500 begins with block 1502 in which the compute sled 1230 determines whether to enable partitioning. In the illustrative embodiment, the compute sled 1230 may determine whether to enable partitioning in response to detecting a setting in a configuration file (e.g., stored in a data storage device 1314), in response to a request from the orchestrator server 1220 or other management server (e.g., a pod manager), and/or based on other factors. Regardless, in response to a determination to enable partitioning, the method 1500 advances to block 1504, in which the compute sled 1230 determines partitions among the sockets 1232, 1234. In doing so, the compute sled 1230 may establish at least one separate partition for each socket, as indicated in block 1506. As indicated in block 1508, the compute sled 1230 may establish partitions for multiple sets of cores within one or more of the sockets 1232, 1234. The compute sled 1230 may establish a separate partition associated with each set of cores executing a different operating system, which in turn, may be executing a different workload (e.g., application), as indicated in block 1510. For example two cores of the processor 1236 may execute one instance of an operating system and an application within the operating system and another two cores of the same processor 1236 may execute another operating system instance and an application within that operating system instance. In such a scenario, the compute sled 1230 may identify each of the two sets of cores as separate partitions. As indicated in block 1512, in determining the partitions, the compute sled 1230, in the illustrative embodiment, also assigns a partition identifier to each determined partition (e.g., in the partition identifier data 1402). In some embodiments, the compute sled 1230 may additionally assign a partition identifier to each of multiple I/O devices (e.g., the communication circuitry 1310, the data storage device(s) 1314) of the compute sled 1230. In such embodiments, a logical function of each I/O device (e.g., the communication circuitry 1310, the data storage device(s) 1314) may provide a partition identifier tagging capability. In other embodiments, the partition identifier tagging capability may be at a physical function level and/or at a root port level. Further, in some embodiments, in assigning a partition identifier, the compute sled 1230 may assign a partition identifier with a mask (e.g., to share a resource among multiple partitions).

Subsequently, the method 1500 advances to block 1514, in which the compute sled 1230 establishes memory spaces for each determined partition. In doing so, the compute sled 1230 may allocate an equal (e.g., the same) amount of memory capacity to each partition, as indicated in block 1516. Alternatively, the compute sled 1230 may allocate different amounts of memory capacity to two or more of the partitions, as indicated in block 1518. In doing so, the compute sled 1230 may determine the amount of memory to allocate to each partition as a function of an SLA associated with the workload (e.g., application) assigned to the partition, as indicated in block 1520. For example, an SLA may indicate that, for the application 1240, four gigabytes of memory are to be allocated and a separate SLA may indicate that for the application 1242, two gigabytes of memory are to be allocated. In the illustrative embodiment, the compute sled 1230 also generates a memory map that associates each partition identifier with a corresponding physical address range in the memory 1246 (e.g., the memory map data 1404), as indicated in block 1522. As indicated in block 1524, the compute sled 1230 may additionally map one or more I/O devices to one or more of the memory spaces. For example, the compute sled 1230 may map the NIC 1312 to a memory range within a memory space established for a partition. In some embodiments, as indicated in block 1526, the compute sled 1230 may exclude an available I/O device from one or more of the memory spaces, thereby blocking the partition (e.g., a processor or certain cores of the processor) from accessing the I/O device through the memory 1246. As indicated in block 1528, the compute sled 1230 may exclude an I/O device from a memory space as a function of an SLA associated with an application executed by the partition. For example, if an accelerator device (e.g., any device or circuitry, such as a co-processor, an application specific integrated circuit (ASIC), or a field programmable gate array (FPGA) capable of accelerating the execution of one or more operations) is present on the compute sled 1230 but the SLA associated with the application to be executed in the corresponding partition does not provide for the use of an accelerator device, the compute device 1220 may determine not to map the accelerator device to the memory space for the partition. Subsequently, the method 1500 advances to block 1530 of FIG. 16, in which the compute sled 1230 executes the application(s) associated with each partition.

Figure 16:
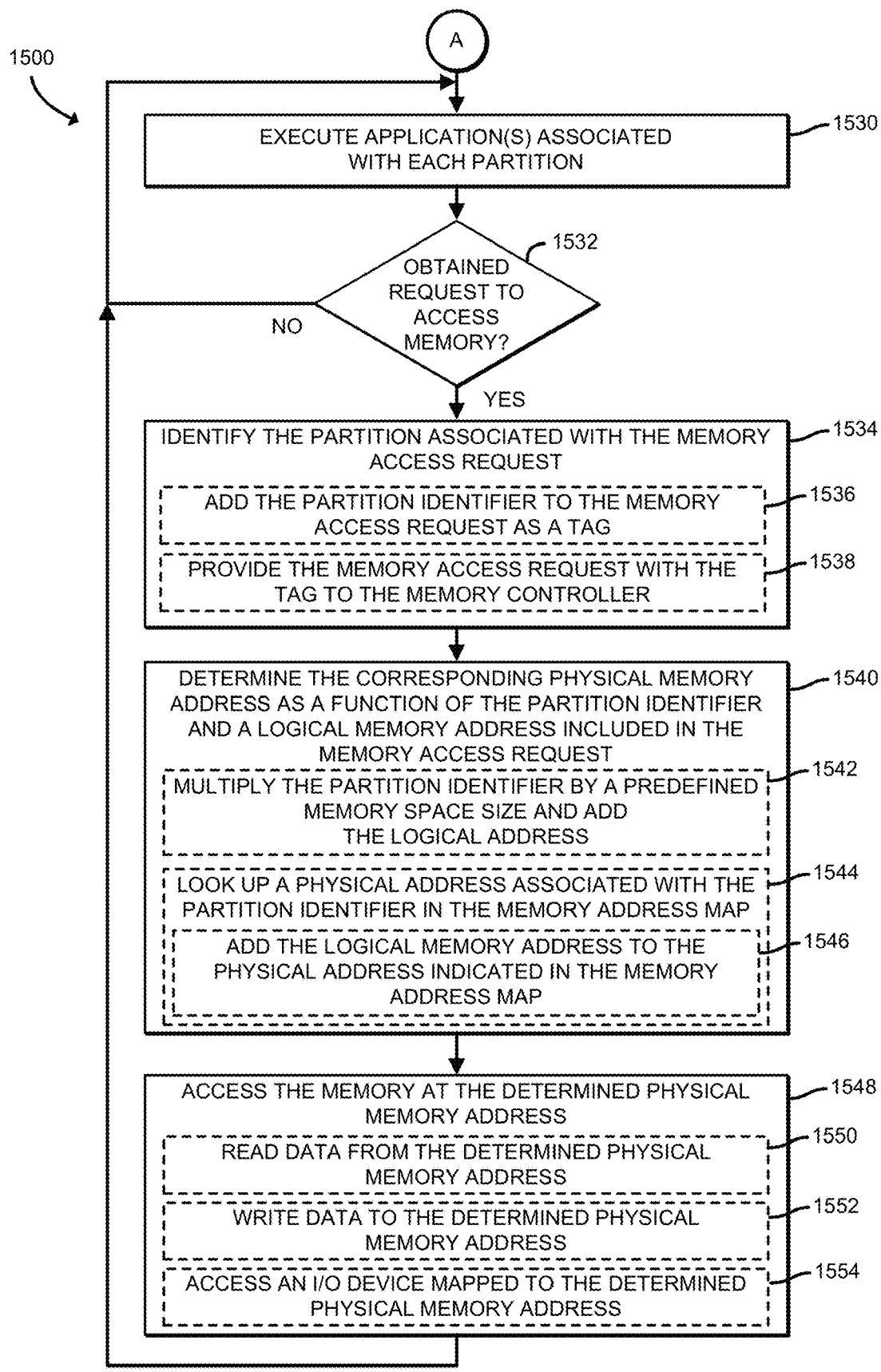

Referring now to FIG. 16, in block 1532, the compute sled 1532 determines whether a request to access memory has been obtained (e.g., generated by an application executed in a partition). If not, the method 1500 loops back to block 1530 to continue executing the applications. However, if a memory access request has been obtained, the method 1500 advances to block 1534, in which the compute sled 1230 identifies the partition associated with the memory access request. In doing so, the compute sled 1230 may add the partition identifier to the memory access request as a tag, as indicated in block 1536. Additionally, the compute sled 1230 may provide the memory access request with the tag to the memory controller 1244, as indicated in block 1538. Similarly, in embodiments in which the I/O devices are assigned partition identifiers, the compute sled 1230 may identify a partition associated with an I/O request and add the partition identifier to the I/O request as a tag.

Subsequently, in block 1540, the compute sled 1230 determines the corresponding physical memory address as a function of the partition identifier and a logical memory address included in the memory access request. In doing so, the compute sled 1230 may multiply the partition identifier by a predefined memory space size (e.g., a partition identifier of two multiplied by a fixed memory space size of two gigabytes) to obtain a base physical address, and then add the logical address from the memory access request as an offset to obtain the final physical memory address, as indicated in block 1542. Alternatively, such as in embodiments in which the memory spaces may be of different sizes, the compute sled 1230 may look up a physical address associated with the partition identifier in the memory address map (e.g., a base physical memory address), as indicated in block 1544. Further, the compute sled 1230 may then add the logical memory address from the memory access request to the physical address indicated in the memory address map to obtain the final physical memory address, as indicated in block 1546.

Afterwards, the method 1500 advances to block 1548, in which the compute sled 1230 accesses the memory at the determined physical memory address. In doing so, the compute sled 1230 may read data form the determined physical memory address, as indicated in block 1550. Alternatively, the compute sled 1230 may write data to the determined physical memory address, as indicated in block 1552. As indicated in block 1554, in accessing the memory at the determined physical memory address, the compute sled 1230 may access an I/O device (e.g., the NIC 1312) mapped to the determined physical memory address. In some embodiments, the request may be an I/O request that includes a tag for a partition. In such embodiments, the compute sled 1230 routes the I/O request to the I/O device associated with the corresponding partition. Subsequently, the method 1500 loops back to block 1530 in which the compute sled 1230 continues execution of the application(s).

EXAMPLES

Illustrative examples of the technologies disclosed herein are provided below. An embodiment of the technologies may include any one or more, and any combination of, the examples described below.

Example 1 includes a compute sled comprising a compute engine having (i) multiple processors and sockets, wherein each processor is associated with a respective socket of the compute sled and (ii) a memory, wherein the compute engine is to determine partitions among the sockets; establish a separate memory space for each determined partition; obtain, from an application executed in one of the sockets, a request to access a logical memory address; identify the partition associated with the memory access request; determine a corresponding physical memory address as a function of the identified partition and the logical memory address; and access the memory at the determined physical memory address.

Example 2 includes the subject matter of Example 1, and wherein to determine partitions among the sockets comprises to establish at least one separate partition for each socket.

Example 3 includes the subject matter of any of Examples 1 and 2, and wherein to establish at least one separate partition for each socket comprises to establish a first partition for a first set of cores in one of the processors; and establish a second partition for a second set of cores in the same processor.

Example 4 includes the subject matter of any of Examples 1-3, and wherein to establish a first partition for a first set of cores in one of the processors and establish a second partition for second set of cores in the same processor comprises to establish a separate partition associated with each set of cores assigned to execute a different instance of an operating system.

Example 5 includes the subject matter of any of Examples 1-4, and wherein to establish a separate memory space for each determined partition comprises to allocate different amounts of memory to two or more of the partitions.

Example 6 includes the subject matter of any of Examples 1-5, and wherein to allocate different amounts of memory to two or more of the partitions comprises to allocate each amount of memory as a function of a service level agreement associated with an application to be executed by each partition.

Example 7 includes the subject matter of any of Examples 1-6, and wherein to establish a separate memory space for each determined partition comprises to generate a memory map that associates a partition identifier for each partition with a corresponding physical address range in the memory.

Example 8 includes the subject matter of any of Examples 1-7, and wherein to establish a separate memory space for each determined partition comprises to map one or more I/O devices to one or more of the memory spaces.

Example 9 includes the subject matter of any of Examples 1-8, and wherein to map one or more I/O devices to one or more of the memory spaces comprises to exclude an I/O device from one of the memory spaces and map the I/O device to another of the memory spaces.

Example 10 includes the subject matter of any of Examples 1-9, and wherein the compute engine is further to assign a partition identifier to each of multiple I/O devices.

Example 11 includes the subject matter of any of Examples 1-10, and wherein the compute engine is further to add a partition identifier to the memory access request and wherein to determine the corresponding physical memory address comprises to look up, in a memory map, a base physical memory address associated with the partition identifier and add the logical memory address to the base physical memory address.

Example 12 includes the subject matter of any of Examples 1-11, and wherein the compute engine is further to add a partition identifier to the memory access request and wherein to determine the corresponding physical memory address comprises to multiply the partition identifier by a predefined memory space size to determine a base physical memory address, and add the logical address to the base physical memory address.

Example 13 includes the subject matter of any of Examples 1-12, and wherein to access the memory at the determined physical memory address comprises to read data from the determined physical memory address.

Example 14 includes the subject matter of any of Examples 1-13, and wherein to access the memory at the determined physical memory address comprises to write data to the determined physical memory address.

Example 15 includes the subject matter of any of Examples 1-14, and wherein to access the memory at the determined physical memory address comprises to access an I/O device mapped to the determined physical memory address.

Example 16 includes the subject matter of any of Examples 1-15, and wherein to determine partitions among the sockets comprises to establish at least two separate partitions, wherein at least one of the two partitions includes multiple sockets.

Example 17 includes the subject matter of any of Examples 1-16, and wherein to determine partitions among the sockets comprises to assign two or more partitions to one socket.

Example 18 includes a method comprising determining, by a compute sled, partitions among sockets of the compute sled, wherein each socket is associated with a corresponding processor of the compute sled; establishing, by the compute sled, a separate memory space for each determined partition; obtaining, by the compute sled, from an application executed in one of the sockets, a request to access a logical memory address; identifying, by the compute sled, the partition associated with the memory access request; determining, by the compute sled, a corresponding physical memory address as a function of the identified partition and the logical memory address; and accessing, by the compute sled, a memory of the compute sled at the determined physical memory address.

Example 19 includes the subject matter of Example 18, and wherein determining the partitions among the sockets comprises establishing at least one separate partition for each socket.

Example 20 includes the subject matter of any of Examples 18 and 19, and wherein establishing at least one separate partition for each socket comprises establishing a first partition for a first set of cores in one of the processors; and establishing a second partition for a second set of cores in the same processor.

Example 21 includes the subject matter of any of Examples 18-20, and wherein establishing a first partition for a first set of cores in one of the processors and establishing a second partition for second set of cores in the same processor comprises establishing a separate partition associated with each set of cores assigned to execute a different instance of an operating system.

Example 22 includes the subject matter of any of Examples 18-21, and wherein establishing a separate memory space for each determined partition comprises allocating different amounts of memory to two or more of the partitions.

Example 23 includes the subject matter of any of Examples 18-22, and wherein allocating different amounts of memory to two or more the partitions comprises allocating each amount of memory as a function of a service level agreement associated with an application to be executed by each partition.

Example 24 includes the subject matter of any of Examples 18-23, and wherein establishing a separate memory space for each determined partition comprises generating a memory map that associates a partition identifier for each partition with a corresponding physical address range in the memory.

Example 25 includes the subject matter of any of Examples 18-24, and wherein establishing a separate memory space for each determined partition comprises mapping one or more I/O devices to one or more of the memory spaces.

Example 26 includes the subject matter of any of Examples 18-25, and wherein mapping one or more I/O devices to one or more of the memory spaces comprises excluding an I/O device from one of the memory spaces; and mapping the I/O device to another of the memory spaces.

Example 27 includes the subject matter of any of Examples 18-26, and further including assigning a partition identifier to each of multiple I/O devices.

Example 28 includes the subject matter of any of Examples 18-27, and further including adding, by the compute sled, a partition identifier to the memory access request; and wherein determining the corresponding physical memory address comprises looking up, in a memory map, a base physical memory address associated with the partition identifier; and adding the logical memory address to the base physical memory address.

Example 29 includes the subject matter of any of Examples 18-28, and further including adding a partition identifier to the memory access request; and wherein determining the corresponding physical memory address comprises multiplying the partition identifier by a predefined memory space size to determine a base physical memory address; and adding the logical address to the base physical memory address.

Example 30 includes the subject matter of any of Examples 18-29, and wherein accessing the memory at the determined physical memory address comprises reading data from the determined physical memory address.

Example 31 includes the subject matter of any of Examples 18-30, and wherein accessing the memory at the determined physical memory address comprises writing data to the determined physical memory address.

Example 32 includes the subject matter of any of Examples 18-31, and wherein accessing the memory at the determined physical memory address comprises accessing an I/O device mapped to the determined physical memory address.

Example 33 includes the subject matter of any of Examples 18-32, and wherein determining partitions among the sockets comprises establishing at least two separate partitions, wherein at least one of the two partitions includes multiple sockets.

Example 34 includes the subject matter of any of Examples 18-33, and wherein determining partitions among the sockets comprises assigning two or more partitions to one socket.

Example 35 includes a compute sled comprising means for performing the method of any of Examples 18-34.

Example 36 includes one or more machine-readable storage media comprising a plurality of instructions stored thereon that, in response to being executed, cause a compute sled to perform the method of any of Examples 18-34.

Example 37 includes a compute sled comprising a compute engine to perform the method of any of Examples 18-34.

Example 38 includes a compute sled comprising means for determining partitions among sockets of the compute sled, wherein each socket is associated with a corresponding processor of the compute sled; means for establishing a separate memory space for each determined partition; means for obtaining from an application executed in one of the sockets, a request to access a logical memory address; means for identifying the partition associated with the memory access request; means for determining a corresponding physical memory address as a function of the identified partition and the logical memory address; and means for accessing a memory of the compute sled at the determined physical memory address.

Example 39 includes the subject matter of Example 38, and wherein the means for determining the partitions among the sockets comprises means for establishing at least one separate partition for each socket.

Example 40 includes the subject matter of any of Examples 38 and 39, and wherein the means for establishing at least one separate partition for each socket comprises means for establishing a first partition for a first set of cores in one of the processors; and means for establishing a second partition for a second set of cores in the same processor.

Example 41 includes the subject matter of any of Examples 38-40, and wherein the means for establishing a first partition for a first set of cores in one of the processors and the means for establishing a second partition for second set of cores in the same processor comprises means for establishing a separate partition associated with each set of cores assigned to execute a different instance of an operating system.

Example 42 includes the subject matter of any of Examples 38-41, and wherein the means for establishing a separate memory space for each determined partition comprises means for allocating different amounts of memory to two or more of the partitions.

Example 43 includes the subject matter of any of Examples 38-42, and wherein the means for allocating different amounts of memory to two or more the partitions comprises means for allocating each amount of memory as a function of a service level agreement associated with an application to be executed by each partition.

Example 44 includes the subject matter of any of Examples 38-43, and wherein the means for establishing a separate memory space for each determined partition comprises means for generating a memory map that associates a partition identifier for each partition with a corresponding physical address range in the memory.

Example 45 includes the subject matter of any of Examples 38-44, and wherein the means for establishing a separate memory space for each determined partition comprises means for mapping one or more I/O devices to one or more of the memory spaces.

Example 46 includes the subject matter of any of Examples 38-45, and wherein the means for mapping one or more I/O devices to one or more of the memory spaces comprises means for excluding an I/O device from one of the memory spaces; and means for mapping the I/O device to another of the memory spaces.

Example 47 includes the subject matter of any of Examples 38-46, and further including means for assigning a partition identifier to each of multiple I/O devices.

Example 48 includes the subject matter of any of Examples 38-47, and further including means for adding a partition identifier to the memory access request; and wherein the means for determining the corresponding physical memory address comprises means for looking up, in a memory map, a base physical memory address associated with the partition identifier; and means for adding the logical memory address to the base physical memory address.

Example 49 includes the subject matter of any of Examples 38-48, and further including means for adding a partition identifier to the memory access request; and wherein the means for determining the corresponding physical memory address comprises means for multiplying the partition identifier by a predefined memory space size to determine a base physical memory address; and means for adding the logical address to the base physical memory address.

Example 50 includes the subject matter of any of Examples 38-49, and wherein the means for accessing the memory at the determined physical memory address comprises means for reading data from the determined physical memory address.

Example 51 includes the subject matter of any of Examples 38-50, and wherein the means for accessing the memory at the determined physical memory address comprises means for writing data to the determined physical memory address.

Example 52 includes the subject matter of any of Examples 38-51, and wherein the means for accessing the memory at the determined physical memory address comprises means for accessing an I/O device mapped to the determined physical memory address.

Example 53 includes the subject matter of any of Examples 38-52, and wherein the means for determining partitions among the sockets comprises means for establishing at least two separate partitions, wherein at least one of the two partitions includes multiple sockets.

Example 54 includes the subject matter of any of Examples 38-53, and wherein the means for determining partitions among the sockets comprises means for assigning two or more partitions to one socket.

The invention claimed is:
1. A compute sled comprising:
a compute engine having (i) multiple processors and sockets, wherein each processor is associated with a respective socket of the compute sled and (ii) a memory, wherein the compute engine is to:
determine partitions among the sockets;
establish a separate memory space for each determined partition;
obtain, from an application executed in one of the sockets, a request to access a logical memory address;
identify the partition associated with the memory access request;
add a partition identifier to the to the memory access request;
determine a corresponding physical memory address as a function of the identified partition and the logical memory address, including multiplying the partition identifier by a predefined memory space size to determine a base physical memory address, and adding the logical address to the base physical memory address; and
access the memory at the determined physical memory address.

2. The compute sled of claim 1, wherein to determine partitions among the sockets comprises to establish at least one separate partition for each socket.

3. The compute sled of claim 2, wherein to establish at least one separate partition for each socket comprises to:
establish a first partition for a first set of cores in one of the processors; and
establish a second partition for a second set of cores in the same processor.

4. The compute sled of claim 3, wherein to establish a first partition for a first set of cores in one of the processors and establish a second partition for second set of cores in the same processor comprises to establish a separate partition associated with each set of cores assigned to execute a different instance of an operating system.

5. The compute sled of claim 1, wherein to establish a separate memory space for each determined partition comprises to map one or more I/O devices to one or more of the memory spaces.

6. The compute sled of claim 5, wherein to map one or more I/O devices to one or more of the memory spaces comprises to exclude an I/O device from one of the memory spaces and map the I/O device to another of the memory spaces.

7. The compute sled of claim 1, wherein the compute engine is further to assign a partition identifier to each of multiple I/O devices.

8. One or more machine-readable storage media comprising a plurality of executable computer program instructions stored thereon that, in response to being executed, cause a compute sled to:
    determine partitions among sockets of the compute sled, wherein each socket is associated with a corresponding processor of the compute sled;
    establish a separate memory space for each determined partition;
    obtain from an application executed in one of the sockets, a request to access a logical memory address;
    identify the partition associated with the memory access request;
    add a partition identifier to the to the memory access request;
    determine a corresponding physical memory address as a function of the identified partition and the logical memory address, including multiplying the partition identifier by a predefined memory space size to determine a base physical memory address, and adding the logical address to the base physical memory address; and
    access a memory of the compute sled at the determined physical memory address.

9. The one or more machine-readable storage media of claim 8, wherein to determine the partitions among the sockets comprises to establish at least one separate partition for each socket.

10. The one or more machine-readable storage media of claim 9, wherein to establish at least one separate partition for each socket comprises to:
    establish a first partition for a first set of cores in one of the processors; and
    establish a second partition for a second set of cores in the same processor.

11. The one or more machine-readable storage media of claim 10, wherein to establish a first partition for a first set of cores in one of the processors and establish a second partition for second set of cores in the same processor comprises to establish a separate partition associated with each set of cores assigned to execute a different instance of an operating system.

12. The one or more machine-readable storage media of claim 8, wherein to establish a separate memory space for each determined partition comprises to map one or more I/O devices to one or more of the memory spaces.

13. A method comprising:
    determining, by a compute sled, partitions among sockets of the compute sled, wherein each socket is associated with a corresponding processor of the compute sled;
    establishing, by the compute sled, a separate memory space for each determined partition;
    obtaining, by the compute sled, from an application executed in one of the sockets, a request to access a logical memory address;
    identifying, by the compute sled, the partition associated with the memory access request;
    adding a partition identifier to the to the memory access request;
    determining, by the compute sled, a corresponding physical memory address as a function of the identified partition and the logical memory address, including multiplying the partition identifier by a predefined memory space size to determine a base physical memory address, and adding the logical address to the base physical memory address; and
    accessing, by the compute sled, a memory of the compute sled at the determined physical memory address.

14. The method of claim 13, wherein determining the partitions among the sockets comprises establishing at least one separate partition for each socket.

15. The method of claim 14, wherein establishing at least one separate partition for each socket comprises:
    establishing a first partition for a first set of cores in one of the processors; and
    establishing a second partition for a second set of cores in the same processor.

16. The method of claim 15, wherein establishing a first partition for a first set of cores in one of the processors and establishing a second partition for second set of cores in the same processor comprises establishing a separate partition associated with each set of cores assigned to execute a different instance of an operating system.

* * * * *